(No Model.)
T. B. WOODWARD.
THILL SUPPORT.
No. 485,023. Patented Oct. 25, 1892.
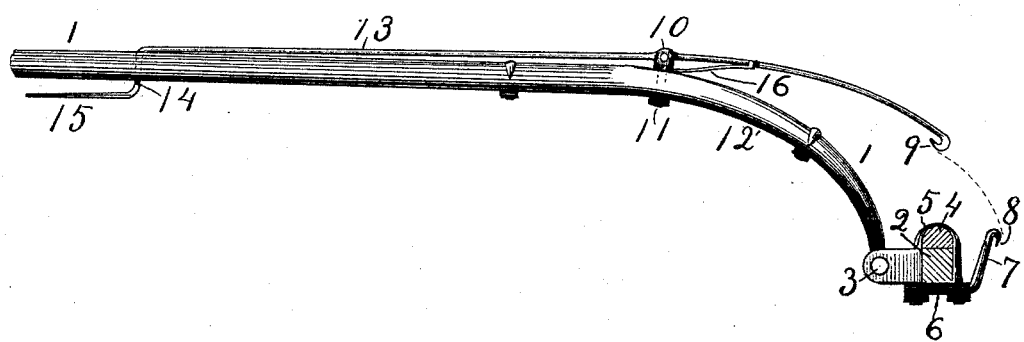
Witnesses,
P. E. Stevens
M. E. Hillyard
Inventor.
Theodore B. Woodward.
by W. X. Stevens Atty.

UNITED STATES PATENT OFFICE.

THEODORE B. WOODWARD, OF NORWAY, PENNSYLVANIA.

THILL-SUPPORT.

SPECIFICATION forming part of Letters Patent No. 485,023, dated October 25, 1892.

Application filed May 25, 1892. Serial No. 434,261. (No model.)

*To all whom it may concern:*

Be it known that I, THEODORE B. WOODWARD, a citizen of the United States, residing at Norway, in the county of Chester and State of Pennsylvania, have invented certain new and useful Improvements in Thill-Supporters; and I do hereby declare the following to be a full, clear, and exact description of the invention, such as will enable others skilled in the art to which it appertains to make and use the same.

This invention relates to that class of thill and tongue supporters by means of which the thills or tongues of buggies, wagons, and various carriages are held raised out of the way and out of danger when not in service; and its object is to adapt such a supporter for use more particularly upon thills in such a manner that its operation will be practically automatic both in catching and holding the thills when they are raised by hand to the required height for safe storage and in releasing them when that is desired.

To this end my invention consists in the construction and combination of parts forming a "thill-supporter," hereinafter described and claimed, reference being had to the accompanying drawing, which is a side elevation of a thill showing my invention, the axle being in transverse vertical section.

1 represents a thill coupled to an axle 2 in any usual manner, as by the hinge 3. Upon the body of the axle 2, which is of iron, the usual wooden helve 4 is secured by means of a clip, one of which is shown at 5. The cross-strap 6 of this clip I make with a rearward and upward extended end 7, which terminates in a hook 8.

9 represents a hook pivoted in a box 10, which is secured to the thill 1 by any suitable means—such as by one of the bolts 11, commonly used to fasten on the hinge-strap 12.

13 is a lever portion of the hook 9, extending two or three feet forward of the pivot-box 10, where it is bent down and passes at 14 freely through a hole in the thill, and about an inch below the thill the lever is bent forward to form a handle 15. A spring 16 is arranged to press the hook 9 upward, so that when the thills are accidentally raised, as by the horse rearing up, this hook will not engage with its mate hook 8, for if it did so engage the thills would be held from descending and be broken when the horse goes forward.

When it is desirable to secure the thills raised, the operator places his hand against the handle 15 in raising the thills, and that presses the lever 13 upward and the hook 9 downward, so that the hook in its backward movement slides and springs over the hook 8 and engages with it, thus holding the thills raised. Then whenever the thills are to be lowered, the operator may touch them anywhere and push them upward or backward a little, and that permits the hook 9 to be thrown by its spring 16 out of engagement with the hook 8, thus releasing the thills. When a person has an awkward or fractious horse to harness to a buggy, his whole attention is required to look after the horse, so I have designed my thill-supporter to automatically release itself by a little upward movement of the thills without having to reach the hook-handle. When the thills are being raised for storage, there is time enough to hunt up the handle 15, but no separate movement is required to secure them raised, and even the finding of the handle is so simple a matter that it could be as readily done in darkness as in the light.

A part of the advantage of this invention might be derived from the use of a lever 13, terminating in a handle above the thill; but I prefer to have it pass through the thill both for convenience in handling and because that steadies it in line without any rattling contact, as there would be if an iron stay were used for that purpose.

A spring hung to impel the pivoted hook normally into engagement with the fixed hook is objectionable, and I do not claim that as my invention.

Having thus fully described my invention, what I believe to be new, and desire to secure by Letters Patent, is the following:

1. The combination, in a thill-supporter, of a hook permanently fixed to the axle of a vehicle, another hook pivoted to a thill to engage with the fixed hook and having a handle extending forward of its pivot, and a spring acting between the pivoted hook and thill to impel the hook normally out of engagement with the fixed hook, substantially as described.

2. The combination, in a thill-supporter, of a hook permanently fixed to a vehicle-axle, another hook pivoted on top of a thill to engage the said fixed hook and provided with a handle extending below the thill, substantially as described, whereby the handle and thill may be both operated to raise and secure the thill by a single movement.

3. The combination, in a thill-supporter, of a hook fixed to a vehicle-axle, another hook pivoted on top of the thill and having a forwardly-extending lever, which passes down through the thill and is bent to form a handle below the thill, substantially as described.

In testimony whereof I affix my signature in presence of two witnesses.

THEODORE B. WOODWARD.

Witnesses:
E. R. GREEN,
M. E. TAYLOR.